Aug. 14, 1934.  N. W. ELMER  1,970,289
CONVEYER
Filed Jan. 12, 1933
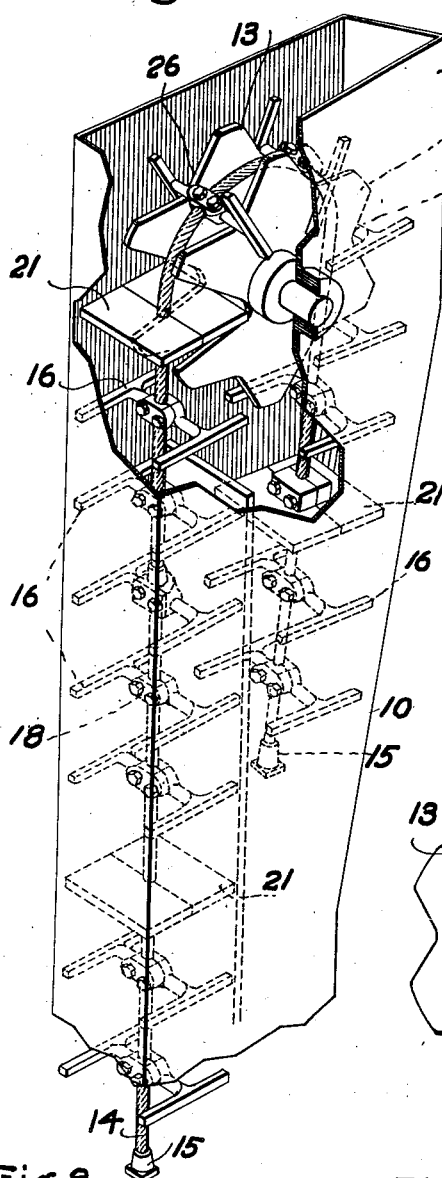
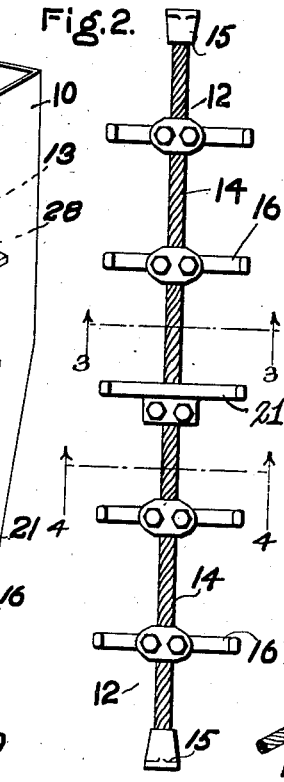
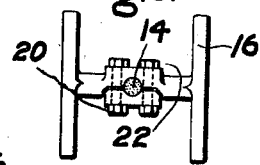
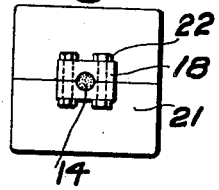
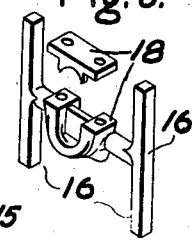
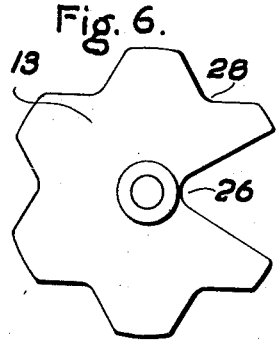
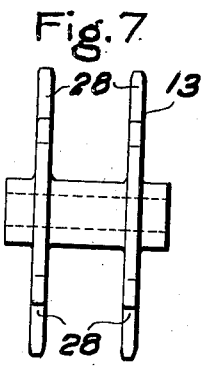
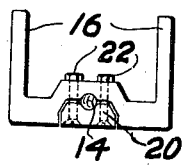
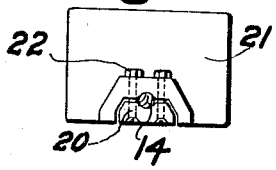
INVENTOR
Nixon W. Elmer
BY
J Finley Churchill
ATTORNEY Patented Aug. 14, 1934

1,970,289

UNITED STATES PATENT OFFICE 1,970,289

CONVEYER

Nixon W. Elmer, Oak Park, Ill., assignor to Redler Conveyor Company, Quincy, Mass., a corporation of Massachusetts Application January 12, 1933, Serial No. 651,333

1 Claim. (Cl. 198—168)

This invention relates to a conveyer for conveying flowable solid material of the type in which a conveying element having transversely extended flights is drawn through a conduit or casing.

The object of the invention is to produce a novel and improved conveyer of the character specified having a novel and improved conveying element particularly designed to facilitate repair and replacement of parts thereof while insuring the maintenance of the conveyer in most efficient operating condition.

With this general object in view and such others as may hereinafter appear, the invention consists in the conveyer and in the various structures, arrangements and combinations of parts hereinafter described and particularly defined in the claims at the end of this specification.

In the drawing illustrating the preferred embodiment of the invention, Fig. 1 is a perspective with portions broken away illustrating the upper portion of a conveyer embodying the present invention; Fig. 2 is a plan of one of the units employed in the construction of the present conveying member; Figs. 3 and 4 are sectional details taken on the line 3—3 and 4—4 of Fig. 2 respectively; Fig. 5 is a detail in perspective illustrating one of the flights used to connect successive portions of the conveying member; Figs. 6 and 7 are details in side and end elevation respectively of one of the sprockets over which the conveying member passes; and Figs. 8 and 9 are details illustrating modified forms of conveyer flights.

The present invention contemplates a conveyer comprising a casing provided with an inlet and an outlet, and a conveying element having a plurality of transversely extended flights, arranged to be drawn through the casing to effect the conveyance therethrough of the solid flowable material. The conveying element may and preferably will be provided with a plurality of transversely extended open flights and may be arranged to be drawn through the conveyer by driving means including one or more rotary elements over which the conveying element is caused to pass. For some purposes it is preferred to provide the conveying element with one or more solid flights, and in order to facilitate the replacement and repair of the conveying element in the event of breakage or damage to any part thereof while insuring the satisfactory operation of the repaired conveyer, I have discovered that by constructing the conveying element of a series of connected duplicate units, and with each unit of a length equal to the pitch circumference of the rotary element or elements over which the conveying element is caused to pass, repairs and replacement of parts of the conveying element may be conveniently made by replacement of the requisite number of units in which the defect occurs. Inasmuch as the units are duplicates of one another, and each is of a length equal to the pitch circumference of the sprockets or other rotary elements, proper and exact registration of the individual flights of the units with the recesses in the rotary elements is insured.

In its preferred form the present invention is, in general, an improvement upon and embodies the invention disclosed in the Redler Reissue Patent No. 18,445, and, as herein shown, comprises a conveyer comprising a conduit 10 having a conveying element 12 associated therewith to be drawn therethrough to effect the conveyance of the flowable solid material through the conduit. The conduit 10 may and preferably will be provided with the usual inlet and outlet (not shown), all as disclosed in said Redler reissue patent. The conveyer is provided with a conveying element 12 having a plurality of spaced conveyer flights and, except as will be described, these conveyer flights may and preferably will be of open structure capable of effecting the conveyance of the flowable solid material in a continuous mass or stream in accordance with the principles of the conveyer forming the subject matter of the aforesaid Redler Reissue Patent No. 18,445.

The conveying element comprises a plurality of duplicate units detachably connected together to form the complete conveying element, and, as above stated, each unit is made of a length equal to the pitch circumference of the sprockets 13 over which the conveying element passes. The individual units of the conveying element may take various forms and, as herein shown, one form of conveying element is illustrated comprising a cable 14 provided with a plurality of flights 16 mounted at definitely spaced intervals thereon and detachably secured thereto. Each cable unit 14 is provided at each end with a connector 15. The conveyer flights 16 may and preferably will comprise open structures, herein shown as comprising H-shaped flights or U-shaped flights, provided with clamping devices 18 having bolts 20 and nuts 22 by which the clamping devices may be clamped to the cable to detachably secure the flights thereon. For some purposes such, for example, as enabling the conveyer conduit to be completely emptied of material, I may prefer to provide each unit of the conveying element with one or more solid flights 21 and when such flights are mounted upon the cable units, the sprockets or other rotary members 13 over which the cable passes will be provided with an extended recess 26 therein in addition to the usual recesses 28 within which the open flights ar received as illustrated.

From the description thus far it will be observed that the present construction of conveying element is made up of the detachably connected duplicate units, each having a plurality of flights secured in definitely spaced relation and with each of a length equal to the pitch circumference of the sprockets, whereby replacement of portions of the conveying element may be conveniently and economically effected, while insuring the proper registration at all times of the individual flights with the recesses in the sprockets over which the conveying element passes.

While as herein shown each unit is illustrated as made up of a cable having flights mounted thereon, it will be understood that other forms of conveying elements, such as are shown in the Redler reissue patent, may be employed if desired.

Having thus described the invention, what is claimed is:—

A conveyer comprising a conduit having an inlet and an outlet, a conveying element traversable through the conduit and provided with a plurality of transversely extended flights for effecting the conveyance of flowable solid material through the conduit, a pair of rotary members over which the conveying element passes, said conveying element comprising a plurality of duplicate units detachably connected together and provided with a plurality of definitely spaced flights of open structure and with at least one flight of solid structure, said units being equal in length to, or a multiple of, the pitch circumference of the rotary elements, said rotary elements being provided with recesses for cooperation with both the open and closed flights during the passage of the conveying element thereover, said solid flights being mounted so that the distance between adjacent solid conveyer flights in the assembled conveyer corresponds to the circular pitch of the recess in the rotary element, and so that the distance from each end of each conveyer unit to the adjacent solid flight is the same in all of the units.

NIXON W. ELMER.